United States Patent [19]

Shen

[11] Patent Number: 4,627,951
[45] Date of Patent: Dec. 9, 1986

[54] PROCESS FOR MANUFACTURING COMPOSITE PRODUCTS FROM LIGNOCELLULOSIC MATERIALS

[75] Inventor: Kuo C. Shen, Ottawa, Canada

[73] Assignee: K. C. Shen Technology International Ltd., Ottawa, Canada

[21] Appl. No.: 480,570

[22] Filed: Mar. 30, 1983

[51] Int. Cl.$^4$ ................................................ B32B 5/16
[52] U.S. Cl. ..................................... 264/109; 264/123
[58] Field of Search ............... 264/109, 123; 156/62.2; 106/200

[56] References Cited

U.S. PATENT DOCUMENTS 4,183,997 1/1980 Stofko ................................. 156/62.2
4,357,194 11/1982 Stofko ................................. 156/336

FOREIGN PATENT DOCUMENTS 0497477 12/1938 United Kingdom ................ 106/200

*Primary Examiner*—Michael Ball
*Attorney, Agent, or Firm*—R. W. Wray

[57] ABSTRACT

A low cost process of making composite products from sugar containing lignocellulosic materials, such as sugarcane bagasse and stalks of sorghum, corn, sunflower, flax, and the like, utilizing the residual sugars as bonding and bulking agent: Comminuted sugar containing lignocellulosic material wholly composed of or partially in combination with other lignocellulosic materials, in the absence of adhesive binders or bonding agents, is molded at a temperature of at least 180° C., and a pressure and for a time sufficient to compound the material into a composite product. The free sugars in lignocellulosic materials act as a thermosetting adhesive binder, and provide both bonding and bulking effect. The composite thus produces possess great strength and excellent dimensional stability. These results are obtained to the greatest extent when the lignocellulosic materials contain higher proportion of sugars.

9 Claims, No Drawings

PROCESS FOR MANUFACTURING COMPOSITE PRODUCTS FROM LIGNOCELLULOSIC MATERIALS

BACKGROUND OF THE INVENTION

This invention relates to the manufacture of composit products from sugarcane bagasse, sorghum stalks, corn stalks, sunflower stalks, flax stalks and other lignocellulosic materials, specifically of non-woody plants containing sugars, carbohydrates, or saccharides, which are water soluble and easily extracted.

More specifically, the invention relates to the manufacture of composite products from sugar containing lignocellulosic materials such as sugarcane bagasse, sorghum stalks, corn stalks, sunflower stalks, flax stalks and the like, without the addition of adhesive binders or bonding agents. This is accomplished by utilizing the free sugars, carbohydrates or saccharides as both bonding and bulking agents with the application of heat.

In the conventional manufacture of sugarcane bagasse panel products, synthetic thermosetting resin binders such as phenol-formaldehyde and urea-formaldehyde have been traditionally used, with the more expensive phenol-formaldehyde being employed for exterior grade products. Conventional resin binders account for a large portion of the total material cost of composite products. It is economically attractive to have composite products made without the use of expensive resin binders. Furthermore, a binderless manufacturing system simplifies the manufacturing process, and reduces production cost by eliminating the blending operation and equipment. Therefore, the desirability of using a binderless process in the manufacture of composite products will be readily appreciated from both economical and technological points of view.

In the conventional manufacturing process of bagasse panel products, the removal of pith and residual free sugars is essential to good quality panel products. The pith, as compared to true fibre, is a very short and thin-walled cell and contains a higher portion of sugars but contributes no strength to the final product. Because it is fluffy, the pith will absorb excessive resin binder particularly when liquid resin is used. Pith also acts like a sponge and soaks up water, swelling excessively if not removed from the bagasse composite panel products. Also, bagasse normally contains from 2 to 6 percent residual sugars, depending on the variety of cane, its maturity, method of havesting and finally, the efficiency of the sugar milling plant. The residual sugars in bagasse, if not removed or minimized before processing, may cause problems in board manufacturing and subsequently in service. Sugars may not be chemically compatible with the conventional resin binders used in bagasse board production and may interfere with bonding, resulting in poor strength. If the residual sugars are not chemically modified or consumed during hot pressing, they may start to ferment when the bagasse board is exposed to humid conditions, thus producing an unpleasant odor and culminating in chemical and biological degradation. This would essentially shorten the useful life of the bagasse board in service.

Consequently depithing and desugaring operations are necessary if satisfactory products are expected to be manufactured from sugarcane bagasse. These operations not only increase the manufacturing cost but also complicate the process.

SUMMARY OF THE INVENTION

In contrast to the conventional process it has been found that composite bagasse products such as building board, furniture board, reconstituted lumber, and molded articles can be produced without the use of resin binder, and the removal of pith and residual sugars. Sugars, corbohydrates, or saccharides provide not only the bonding agent but also the bulking element in the lignocellulosic materials, resulting in a composite product with good strength property and superb dimensional stability.

According to the present invention, the process essentially requires a comminuted mass of bagasse or other lignocellulosic materials containg high proportion of free sugars, particularly from non-woody plants. The comminuted mass was first dried to a low moisture content, preferably in 2-8 percent based on oven dry weight. This mass may be wholly composed of or partially combined with other lignocellulosic or non-lignocellulosic materials. The mass is molded without any added resin binders at a temperature of at least 180° C. and at a pressure sufficient to compound the material into a molded product, for a sufficient period of time to develop and thermoset the bond in situ, transforming the residual sugars to an insoluble and infusible polymeric substance which is highly resistant to boiling water and acid hydrolysis.

The comminution of raw materials is especially useful, because individual particles, flakes or strands facilitate and improve the forming and molding operation. Furthermore comminution also reduces and minimizes the presence of epidermal material from the stem of plants. The thin exterior layer of epidermix, which normally consists of cuticle material, is impervious to water and to adhesive bonding. In a binderless system, finer particles usually produces better products, mainly because of uniform and close compact between individual particles, resulting in a strong bond, a tight and smooth texture. On the contrary, the conventional process is economically not able to use finer particles, because finer particles require increased amount of expensive synthetic resin binder. The present invention prefers to use extremely fine particles when combined with other non-sugar containg lignocellulosic materials in manufacture composite products. Essentially the fine particles act as a pawdered resin binder in the conventional manufacturing process.

DESCRIPTION OF PREFERRED EMBODIMENT

The favorable effect of the use of sugarcane bagasse and other sugar containing lignocellulosic materials of non-woody plants in particular, may be ascribed to the sugars and water soluble materials occurring within, which will flux during the hot molding operation and will polymerize and bond in-situ the lignocellulosic material together. In addition, the sugars and water soluble materials, which permeated within cell wall of lignocellulosic tissues will also be transformed and thermoset to a crosslinked rigid substance, acting as a bulking agent throughout the entire molded article. Thus, the molded articles display an excellent strength property, dimensional stability and resistance to boiling water and to acid hydrolysis. These results are obtained to the greatest extent when the lignocellulosic materials contain a high proportion of sugars and water soluble materials.

The chemical reactions involved in the bonding system in the present invention have been fully elucidated. It is well known that sugar is degraded to compounds of small molecule weight by both acid and alkalis, with the loss of water from the sugar molecule. If a weak acid, or even pure water at a temperature of 130°-170° C. and under pressure is reacted with sugar, about 20 percent of hydroxymethyl-furfural is produced. Other intermediates and furfural derivatives may also be produced from carbohydrates under similar conditions. These derivatives are very reactive which can further polymerize and transform to produce insoluble and infusible crosslinked substances at elevated temperature. Thus the thermoset bond so produced is highly resistant to boiling water and to acid hydrolysis.

It is believed that all or some of the above mentioned reactions may be involved in the bonding formation process of the present invention. It is further believed that chemical transformation of sugars and water soluble materials at elevated temperature is an irreversible chemical and physical change and is essential to the present invention. It is assumed that the polymerized bonding and bulking substance of the present invention contains a furan dehydration product of the carbohydrate which consists essentially of hydroxymethyl-furfural.

It has been found that the physical and mechanical properties of sugarcane bagasse board produced by the present invention are at least comparable to or better than the properties of conventional bagasse boards produced by hitherto use of expensive synthetic resin binders.

Embodiment of the invention will be described and illustrated in detail in the following examples.

EXAMPLE 1

Dried sugarcane bagasse containing 3.8 percent moisture content was obtained from a conventional sugar milling factory. It contained 7.2 percent by weight of water soluble materials from which 4.7 percent of reducing sugars (as glucose), determined by Swedish Cellulose Industry method CCA-11 was found. Futher experimentatation indicated the bagasse contained about 70 percent true fibre and 30 percent pith by weight.

The bagasse was hammermilled to produce two fractions of particles. Particles passing a 16 mesh tyler screen were used for the face layer and particles larger than 16 mesh were used as core material for a 3-layer mat. The face and core ratio by oven dry weight was 1 to 1. From this mat, a board 500×500×11.1 mm, was hot pressed for 12 minutes to a specific gravity of 0.72 at a temperature of 235° C. and a pressure of 2.8 MPa. During the hot-passing, it was noted that a certain amount of material other then the moisture was evaporated in form of steam and various fumes. The weight loss of the mat amounted to 8.4 percent, far more than the original mat miosture content of 3.8 percent. The extra weight loss indicated the rigorous chemical reaction under elevated temperatures. Final analysis confirmed that only 0.7 percent of reducing sugar was found remaining in the finished board. It was far less than that found in a commercial bagasse board.

Bending strength tests showed a dry MOR (modules of repture) of 16.3 Mpa and a dry MOE (modules of elasticity) of 3.8 Gpa. The wet MOR was 8.6 Mpa. The wet bending strength was obtained by immersing the specimens in boiling water for two hours and then testing them wet and cold. The boil test is required by Can-3-0188-2M78 standard for exterior grade poplar waferboard. The Canadian minimum standards for dry and wet MOR are 14 and 7 Mpa respectively. In summary the bagasse board met all the Canadian standards for wood composit panel specified for exterior application.

EXAMPLE 2

Sugarcane rinds were produced by a sugarcane separator machine which separates the inner sugar containing soft pith from the outer hard layer, or rind of the sugarcane stalk. The rind bagasse contained 28.6 percent water soluble materials and 17.3 percent reducing sugars because sugars were not extracted from it.

The rind bagasse was shredded to strands of 1.5 to 3.2 mm in both width and thickness, and containing about 5 percent moisture. Strands ranged in lengths from 15 to 300 mm and were oriented in one direction to be molded into a composite lumber having a dimension of 38×50×2650 mm and a specific gravity of 0.65. The molding temperature was 225° C. at a pressure of 3.4 Mpa for 30 minutes. Bending strength tests showed a dry MOR of 31.6 Mpa and a wet MOR of 18.6 Mpa.

EXAMPLE 3

Fresh sugarcane rinds produced from a sugarcane separator machine were treated to remove sugars by boiling them in water for different lengths of time. Three batches of rind were subjected to a 5, 10 and 30 minute boiling period respectively, and a fourth batch was not boiled but included in the experiment as a control. After boiling, the rinds were dried to an 8 percent moisture content and than hammer milled into the factions of ±20 mesh tyler screen. Chemical analysis indicated that the resulting residual sugars are inversely proportional to the increase in the boiling period. It also revealed a close linear relationship between water soluble materials and reducing sugars. The following Table 1 lists the results of the boiling treatment.

TABLE 1

| SUGAR CONTENT OF 4 BATCHES OF RIND TREATED BY BOILING IN WATER | | | |
|---|---|---|---|
| BATCH NO. | TREATMENT (BOILING) | SOLUBLE EXTRACTED (%)* | REDUCING SUGAR (%)* |
| #1 | NONE | 24.4 | 15.2 |
| #2 | 5 MIN | 16.0 | 11.2 |
| #3 | 10 MIN | 12.3 | 10.2 |
| #4 | 30 MIN | 5.4 | 3.7 |

*Content in terms of oven dry weight of rind fibre.

Each batch of rind furnish was used to make six boards of 500×500×11.1 mm and a specific gravity of about 0.70, using three different press temperatures (180°, 210° and 240° C.) two different press times (10, and 20 minutes) and a closing pressure of 3.4 Mpa. The moisture content of face layer furnish (−20 mesh) was about 9.0 percent and the core furnish (+20 mesh) was 3.0 percent. The face and core ratio by oven dry weight of the mat was 1 to 1. Test results on 48 boards, are listed in the following Table 2.

TABLE 2

| RIND BATCH | PROPERTIES OF SUGAR CANE RIND BOARDS (11.1 mm) | | | | | | | | |
|---|---|---|---|---|---|---|---|---|---|
| | PRESS CONDITION | | SPECIFIC GRAVITY | MOE (GPa) | MOR(MPa) | | IB (kPa) | SWELL (%) | SPRINGBACK (%) |
| | Temp (°C.) | Time (M) | | | Dry | Wet | | | |
| No. 1 Control | 180 | 10 | 0.72 | 5.01 | 23.0 | 5.2 | 686 | 23 | 10.8 |
| (15.2% Reducing | | 20 | 0.74 | 5.12 | 22.3 | 7.7 | 749 | 18 | 9.2 |
| Sugar) | 210 | 10 | 0.72 | 5.06 | 23.2 | 10.4 | 658 | 13 | 7.1 |
| | | 20 | 0.75 | 5.20 | 23.3 | 11.5 | 714 | 9 | 3.8 |
| | 240 | 10 | 0.74 | 4.85 | 20.7 | 11.0 | 679 | 11 | 1.6 |
| | | 20 | 0.75 | 5.24 | 23.5 | 14.5 | 735 | 7 | 0.7 |
| No. 2 5 min. | 180 | 10 | 0.73 | 4.91 | 17.3 | 3.0 | 644 | 27 | 13.3 |
| Boil | | 20 | 0.75 | 5.00 | 19.1 | 5.4 | 623 | 21 | 11.0 |
| (11.2% Reducing | 210 | 10 | 0.73 | 4.85 | 19.0 | 8.3 | 630 | 19 | 8.5 |
| Sugar) | | 20 | 0.76 | 4.81 | 18.6 | 9.1 | 679 | 16 | 3.1 |
| | 240 | 10 | 0.75 | 5.01 | 19.5 | 10.8 | 630 | 16 | 3.8 |
| | | 20 | 0.75 | 5.05 | 19.2 | 11.4 | 602 | 15 | 2.7 |
| No. 3 10 min | 180 | 10 | 0.70 | 4.75 | 18.1 | 1.9 | 574 | 29 | 16.4 |
| Boil | | 20 | 0.72 | 4.72 | 18.4 | 3.8 | 616 | 25 | 13.7 |
| 10.2% Reducing | 210 | 10 | 0.72 | 4.59 | 17.6 | 6.2 | 630 | 24 | 14.5 |
| Sugar) | | 20 | 0.73 | 4.76 | 18.8 | 7.4 | 637 | 19 | 11.6 |
| | 240 | 10 | 0.73 | 4.66 | 18.7 | 8.5 | 602 | 18 | 11.8 |
| | | 20 | 0.75 | 4.91 | 18.3 | 9.2 | 623 | 16 | 9.2 |
| No. 4 30 min. | 180 | 10 | 0.70 | 3.03 | 15.0 | 0.7 | 266 | 44 | 23.5 |
| Boil | | 20 | 0.72 | 3.23 | 16.6 | 2.1 | 297 | 38 | 19.7 |
| (3.7% Reducing | 210 | 10 | 0.73 | 3.00 | 16.4 | 4.5 | 288 | 36 | 18.4 |
| Sugar) | | 20 | 0.73 | 2.88 | 16.8 | 5.1 | 302 | 25 | 16.2 |
| | 240 | 10 | 0.74 | 3.33 | 15.7 | 6.4 | 416 | 29 | 17.1 |
| | | 20 | 0.75 | 3.05 | 16.0 | 7.3 | 430 | 22 | 15.3 |

CAN3-0188.2M78 (Waferboard) sets forth the minimum requirements for MOE: 2.70 GPa, MOR: 14.0 and 7.0 MPa respectively for dry and wet, and IB: 280 kPa.

It was evident from these test results as indicated in Table 2, that board properties improved as sugar content of rind increased. Higher press temperature and longer press time also enhanced board quality. The rind furnish board had a tight, smooth surface and dark brownish colour mainly due to the extremely fine particles, and high sugar and moisture content in facelayer of the mat. The dimensional stability of the rind bagasse board, particularly of those made with higher sugar content and rigorous pressing, was excellent compared to the products of the conventional process. This resulted from the bonding and the bulking effect of polymerized sugars.

EXAMPLE 4

This example illustrates sugarcane bagasse in combination with other lignocellulosic materials to form a mixed composite product.

Sugarcane rind bagasse which contained about 19 percent reducing sugars was hammer milled to pass through a 20 mesh tyler screen. These rind bagasse splinters were mixed with poplar wood splinters of similar size at a ratio of 70:30 by weight. From the mixture was formed a mat that was hot-pressed at 235° C. with 2.8 Mpa pressure for 10 minutes, producing a 500×500×11.1 mm board with a specific gravity of 0.72. Static bending tests showed a dry MOR of 18.2 Mpa and a wet MOR of 8.1 Mpa. The internal bonding test gave a tension perpendicular strength of 390 kPa. All the testing values surpassed the minimum requirements by CAN 3-0188-2M78.

EXAMPLE 5

This example illustrates that similar results can be produced with other sugar containing lignocellulosic materials.

Sweet sorghum stalks which contained about 18 percent reducing sugars were dried to 3 percent moisture content and hammer milled to pass through a 20 mesh tyler screen. A board (500×500×11.1 mm and 0.75 specific gravity) was made with this furnish under the similar press conditions outlined in Example 4. Test results showed a dry MOR of 18.5 Mpa, wet MOR of 9.2 Mpa, and an internal bond strength of 480 kPa.

Corn stalks which contained about 12% soluble materials or about 7% reducing sugars were dried to 3% moisture content and hammer milled to pass through a 20 mesh tyler screen. A board (500×500×11.1 mm and 0.82 specific gravity) was made with this furnish under the similar press condition outlined in Example 4. Test result showed a dry MOR of 14.3 Mpa wet MOR of 7.4 Mpa, and an internal bonding strength of 320 Kpa.

Having thus described my invention in preferred embodiment, I claim:

1. A process for making waterproof composite products from comminuted sugar containing lignocellulosic materials without the addition of adhesive binders or chemical catalysts or high pressure steam, which comprises the steps of separating the raw materials into particles, fibres, strands, and flakes, drying the comminuted raw materials, forming the previously dried raw materials into a desired mat, pressing the mat in an open pressing step, and heating the formed mat at a temperature of 180° C. or higher and a pressure and a time sufficient to consolidate said mat into a molded article, while the adhesive bond is developed and thermoset in situ, transforming and polymerizing sugars and water soluble materials into an insoluble and infusible crosslinked substance as bonding and bulking agent which is resistant to boiling water and to acid hydrolysis, wherein the sugars and water soluble materials contain lignocellulosic materials and are selected from sugar cane stalks, sorghum stalks, corn stalks, and sun flower stalks.

2. The process of claim 1 wherein the sugars are free sugars, carbohydrates or saccharides, which are water soluble, easily extracted, and readily transformed, and thermoset with the application of heat, into an insoluble and infusible substance capable of bonding and bulking.

3. The process of claim 1 wherein the sugars and water soluble materials occurring within the lignocellulosic materials are chemically transformed and thermoset under an elevated temperature of 180° C. or higher into an insoluble and infusible crosslinked polymeric substance, which provides both the bonding and the bulking agent in the molded article.

4. The process of claim 1 wherein the hot molding and pressing temperature is 220° C. or higher.

5. The process of claim 1 wherein the sugars and water soluble materials, which remain the finished composit products, are greatly reduced through the chemical transformation and weight loss during molding operation at an elevated temperature of 180° C. or higher.

6. The process of claim 1 wherein the sugar containing lignocellulosic materials are comminuted and combined with other lignocellulosic or non-lignocellulosic materials to produce composite products.

7. The process of claim 1 wherein the sugars, water soluble materials and pith are partially or not removed prior to manufacturing.

8. The process of claim 1 wherein the sugar containing lignocellulosic materials are comminuted to extremely fine particles or fibers for the manufacture of composite products having a strong bonding strength, an excellent dimensional stability, and a tight, uniform, smooth and fine texture.

9. The process of claim 1 wherein the composite products are building board, furniture board, reconsititute lumber, compressed fire log, and molded articles with a water-proof bond which is resistant to boiling water and acid hydrolysis.

* * * * *